US008323138B2

(12) United States Patent
Legner

(10) Patent No.: US 8,323,138 B2
(45) Date of Patent: Dec. 4, 2012

(54) POWER SPLIT TRANSMISSION

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 434 days.

(21) Appl. No.: 12/679,525

(22) PCT Filed: Aug. 15, 2008

(86) PCT No.: PCT/EP2008/060764
§ 371 (c)(1),
(2), (4) Date: Mar. 23, 2010

(87) PCT Pub. No.: WO2009/047042
PCT Pub. Date: Apr. 16, 2009

(65) Prior Publication Data
US 2010/0197438 A1  Aug. 5, 2010

(30) Foreign Application Priority Data

Oct. 2, 2007  (DE) .................. 10 2007 047 194

(51) Int. Cl.
*F16H 47/04* (2006.01)
(52) U.S. Cl. ............................. 475/80; 475/82
(58) Field of Classification Search .............. 475/80, 475/73, 82
See application file for complete search history.

(56) References Cited

U.S. PATENT DOCUMENTS

| | | |
|---|---|---|
| 2,583,656 A | 1/1952 | Lay |
| 2,808,737 A | 10/1957 | Bullard, III |
| 3,023,638 A | 3/1962 | Westbury et al. |
| 3,204,486 A | 9/1965 | Lalio |
| 3,212,358 A | 10/1965 | Lalio |
| 3,580,107 A * | 5/1971 | Orshansky, Jr. .................. 475/78 |
| 3,601,981 A | 8/1971 | Ifield |
| 3,626,787 A | 12/1971 | Singer |
| 3,714,845 A | 2/1973 | Mooney, Jr. |
| 3,834,164 A | 9/1974 | Ritter |
| 4,019,404 A | 4/1977 | Schauer |
| 4,024,775 A * | 5/1977 | Anderson et al. ............... 475/78 |
| 4,121,479 A | 10/1978 | Schauer |
| 4,434,681 A | 3/1984 | Friedrich et al. |
| 4,446,756 A | 5/1984 | Hagin et al. |
| 4,563,914 A | 1/1986 | Miller |
| 4,776,233 A | 10/1988 | Kita et al. |
| 4,813,306 A | 3/1989 | Kita et al. |
| 4,976,664 A | 12/1990 | Hagin et al. |
| 5,071,391 A | 12/1991 | Kita |
| 5,421,790 A | 6/1995 | Lasoen |
| 5,643,122 A | 7/1997 | Fredriksen |
| 5,667,452 A | 9/1997 | Coutant |
| 5,766,107 A | 6/1998 | Englisch |
| 5,868,640 A | 2/1999 | Coutant |
| 5,890,981 A | 4/1999 | Coutant et al. |

(Continued)

FOREIGN PATENT DOCUMENTS

AT  197 650 B  10/1957

(Continued)

*Primary Examiner* — Sherry Estremsky
(74) *Attorney, Agent, or Firm* — Davis & Bujold, PLLC

(57) ABSTRACT

A power split transmission for a working machine, such as a wheel loader, for example, has a hydrostatic and a mechanical power branch which are summed with one another via a summation gear (12). A reversing gear (7) is connected downstream of the summation gear (12) and a gear shifting mechanism (20) is connected downstream of the summation gear (12).

9 Claims, 2 Drawing Sheets

U.S. PATENT DOCUMENTS

| | | | |
|---|---|---|---|
| 6,029,542 | A | 2/2000 | Wontner |
| 6,056,661 | A | 5/2000 | Schmidt |
| 6,358,174 | B1 * | 3/2002 | Folsom et al. .................. 475/72 |
| 6,485,387 | B1 | 11/2002 | Goodnight et al. |
| 6,592,485 | B2 | 7/2003 | Otten et al. |
| 6,761,658 | B1 | 7/2004 | Stettler, Jr. |
| 7,097,583 | B2 | 8/2006 | Lauinger et al. |
| 7,354,368 | B2 | 4/2008 | Pollman |
| 7,448,976 | B2 | 11/2008 | Hiraki et al. |
| 2002/0042319 | A1 | 4/2002 | Otten et al. |
| 2003/0089107 | A1 | 5/2003 | Tani |
| 2003/0150662 | A1 | 8/2003 | Tani |
| 2003/0166430 | A1 | 9/2003 | Folsom et al. |
| 2004/0242357 | A1 | 12/2004 | Ishizaki |
| 2006/0094554 | A1 | 5/2006 | Schmidt |
| 2006/0276291 | A1 | 12/2006 | Fabry et al. |
| 2007/0277520 | A1 | 12/2007 | Gollner |
| 2007/0281815 | A1 | 12/2007 | Gollner |
| 2008/0085801 | A1 | 4/2008 | Sedoni et al. |
| 2008/0103006 | A1 | 5/2008 | Pollman et al. |
| 2008/0214349 | A1 | 9/2008 | Liebherr et al. |
| 2008/0214351 | A1 | 9/2008 | Katayama et al. |
| 2009/0270212 | A1 | 10/2009 | Ueda et al. |
| 2010/0056318 | A1 | 3/2010 | Glockler |

FOREIGN PATENT DOCUMENTS

| | | |
|---|---|---|
| DE | 1 069 978 | 11/1959 |
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

POWER SPLIT TRANSMISSION

This application is a National Stage completion of PCT/EP2008/060764 filed Aug. 15, 2008, which claims priority from German patent application serial no. 10 2007 047 194.9 filed Oct. 2, 2007.

FIELD OF THE INVENTION

The invention concerns a power split transmission.

BACKGROUND OF THE INVENTION

Power split transmissions of this kind have one hydrostatic power branch and one mechanical power branch, which are summed via a summation gear in order to drive an output means.

The hydrostatic-mechanical transmission with power split disclosed in DE 28 54 375 A1 has two shift ranges, and the continuously variable control of the transmission is carried out by means of the hydrostatic power branch.

SUMMARY OF THE INVENTION

The invention has as an object the creation of a power split transmission with at least two operating ranges, wherein at least two operating ranges are available in one forward travel direction and in one reverse travel direction, and the transmission is characterized by a simple control of the hydrostatic power branch.

The object is attained with a power split transmission of the specified kind, which has the characteristic features of the main claim.

The power split transmission has one hydrostatic power branch and one mechanical power branch, which are summed in a summation gear. A reversing gear, by means of which the direction of rotation of the transmission input shaft can be reversed depending on the desired direction of travel, is connected upstream of the summation gear.

The summation gear is preferably configured as a planetary gear set for use with the power split transmission in a working machine, for example, a wheel loader, wherein the outer central gear of the planetary gear set is operatively connected to the output shaft of the reversing gear, the sun gear of the planetary gear set is operatively connected to the first hydrostatic unit, and the planetary gear carrier of the planetary gear set is operatively connected to a downstream gear shifting mechanism. The gear shifting mechanism is configured herein as a spur gear unit, whereby the axle offset needed for the wheel loader can be obtained in this combination.

In one embodiment of the invention, a first clutch for forward travel is arranged in the reversing gear coaxially with respect to the input shaft of the power split transmission and the planetary gear set, the gear shifting mechanism and the clutch for reverse travel are arranged outside of the input shaft of the power split transmission, that is, not coaxial thereto. The second hydrostatic unit is operatively connected to the planetary gear carrier of the summation gear, either directly or via a spur gear stage, and is arranged preferably next to the first hydrostatic unit. The first and second hydrostatic units have a common component, by means of which the displacements of the first and of second hydrostatic units can be adjusted simultaneously, wherein the first and second hydrostatic units are configured as hydrostatic units in a transverse axis design. The displacements of the first and of the second hydrostatic unit are configured such that in the first operating mode of the power split transmission with rotating input shaft and stopped output shaft, the common component adjusts the first and the second hydrostatic units in such a way that the first hydrostatic unit, which is operatively connected to the sun gear, is adjusted to zero displacement, and the second hydrostatic unit, which is directly connected in operative connection to the planetary gear carrier, is adjusted to its maximum displacement. In a second mode of operation of the power split transmission at maximum possible rotational speed of the output drive, the displacement of the first hydrostatic unit is adjusted to its maximum displacement, and the displacement of the second hydrostatic unit is adjusted to zero displacement, whereby that the total power is transferred purely mechanically. If the standard transmission is to be shifted from a first gear to a second gear, then the two gear clutches are actuated to engage, wherein at least one of these gear clutches is kept in a slip mode until the load has been transferred from the one gear clutch to the other gear clutch, wherein the gear ratio, that is, the displacement, is reduced during this transfer via the common component by the progressive ratio between the first and the second gear. The power split transmission can be shifted without interruption of tractive force by means of this procedure during range shifting.

BRIEF DESCRIPTION OF THE DRAWINGS

Additional features are disclosed in the description of the figures. In the figures.

DETAILED DESCRIPTION OF THE PREFERRED EMBODIMENTS

Figure 1:
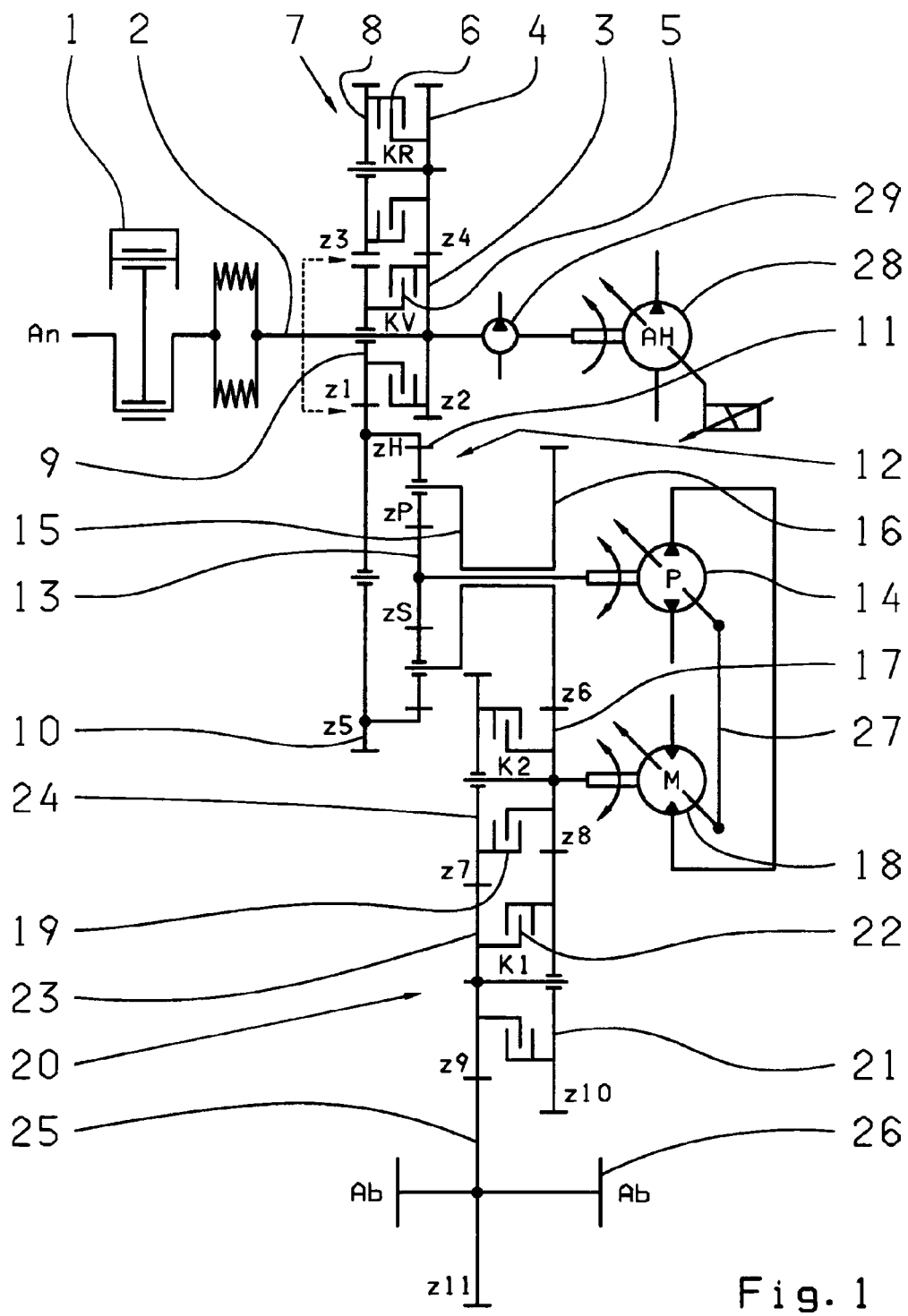
FIG. 1 shows a kinematic diagram of a power split transmission with the working pump arranged coaxial with respect to the input shaft.
Figure 2:
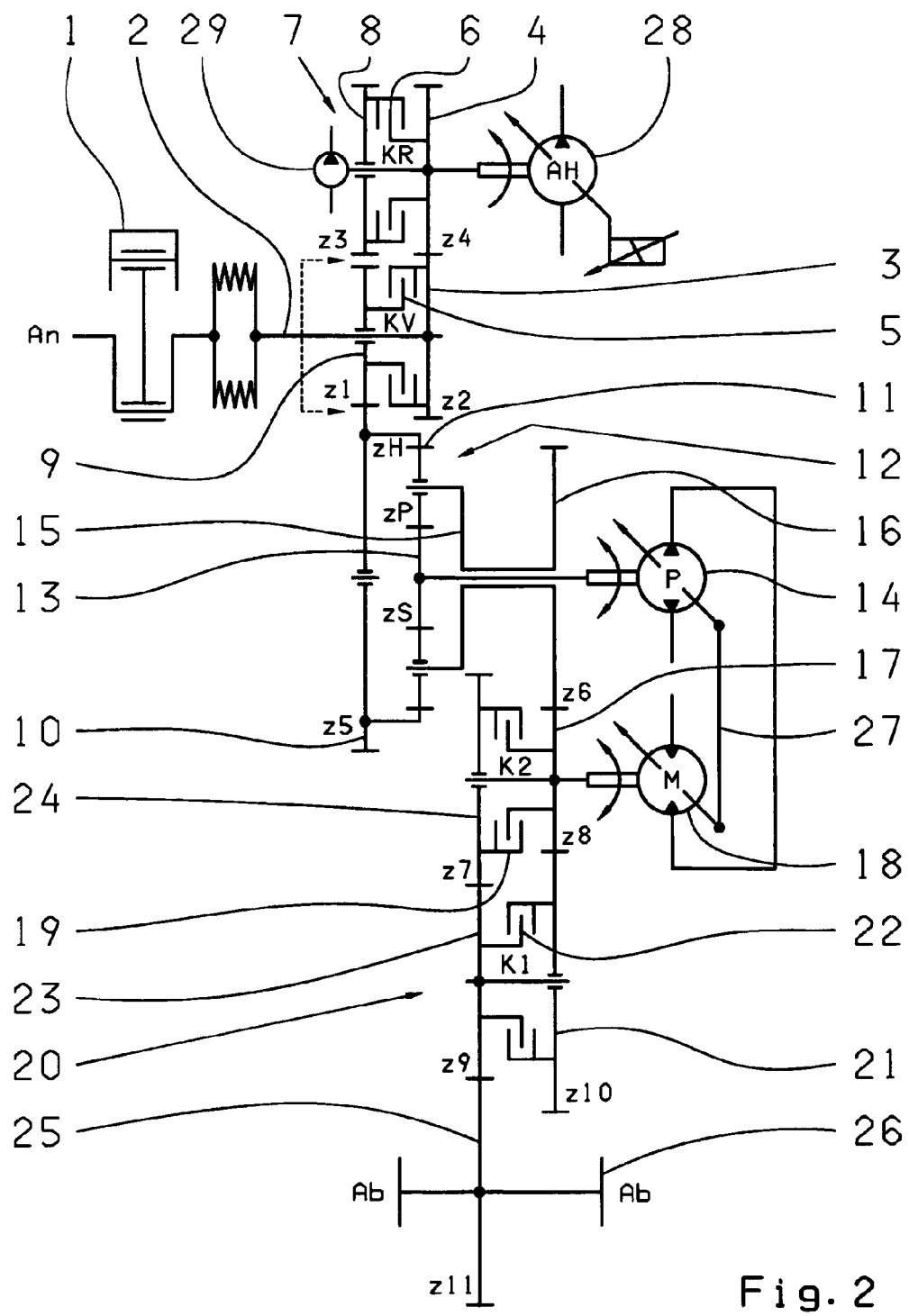
FIG. 2 shows a power split transmission with the working pump not arranged coaxially with respect to the input shaft.

FIG. 1.

A drive engine 1 drives the input shaft 2 of the power split transmission. The input shaft 2 is connected in a rotationally fixed manner to the spur gear 3. The spur gear 3 is operatively connected to the spur gear 4, wherein the clutch for forward travel 5 and the clutch for reverse travel 6 and the spur gear 3 and the spur gear 4 form the reversing unit 7. The spur gear 8, which can be connected to the spur gear 4 via the clutch for reverse travel 6, and the spur gear 9, which can be connected to the spur gear 3 via the clutch for forward travel 5, are operatively connected to the spur gear 10. The spur gear 10 is connected in a rotationally fixed manner to the outer central gear 11 of the planetary gear set 12. The planetary gear set 12 forms the summation gear for the mechanical power branching and the hydrostatic power branch. The inner central gear 13 of the planetary gear set 12 is connected in a rotationally fixed manner to the first hydrostatic unit 14. The planetary gear carrier 15 is connected in a rotationally fixed manner to the spur gear 16. The spur gear 16 is operatively connected to the spur gear 17, wherein the spur gear 17 is connected in a rotationally fixed manner to the second hydrostatic unit 18 and the gear clutch 19 for the second gear of the reduction gear 20. The spur gear 17 is operatively connected to spur gear 21, which can be connected to spur gear 23 via the gear clutch 22. The spur gear 17 can be connected to spur gear 24 via the gear clutch 19. The spur gear 24 is operatively connected to spur gear 23. The spur gear 23 drives the spur gear 25 and the latter drives in turn the output drive 26. The first hydrostatic unit 14 and the second hydrostatic unit 18 are configured as hydrostatic units in a transverse axis design, wherein the displacements can be adjusted via a common component 27 and the hydrostatic units 14 and 18 are arranged adjacent to each other. A working pump 28, as well as a feed and lubrication pressure pump 29, is arranged coaxially with respect to the input shaft 2. For startup in forward travel direction with rotating input shaft 2, the clutch for forward travel 5 is engaged, the clutch for reverse travel 6 is open, the gear clutch 19 is disengaged, and the gear clutch 22 is engaged. The first hydrostatic unit 14 is adjusted to zero displacement and the second hydrostatic unit 18 is adjusted to its maximum displacement. In this situation, the output drive 26 is at standstill. If the common component 27 is now adjusted, then the first hydrostatic unit 14 is adjusted from its zero displacement and pumps pressurizing medium to the second hydrostatic unit 18, which is connected to the first hydrostatic unit 14 in a closed circuit. The output drive 26 begins to rotate. At the maximum possible adjustment of the common component 27, the first hydrostatic unit 14 is at its maximum displacement and the second hydrostatic unit 18 is at zero displacement. The total power is transferred herein exclusively via the mechanical power branch to the output drive 26. If the second gear is to be selected, then the gear clutch 19 is likewise operated in an engaging direction toward the engaged gear clutch 22, wherein either the gear clutch 19 or the gear clutch 22 or both gear clutches are kept in a slip mode until the common component 27, the first hydrostatic unit 14, and the second hydrostatic unit 18 are adjusted in such a manner that the displacements and thus the rotational speed of the hydrostatic units 14 and 18 are adapted to the new gear ratio. The gear clutch 22 is subsequently fully disengaged and the gear clutch 19 is fully engaged. The input drive can now be further modified in its output speed by adjusting the common component 27.

FIG. 2:

This figure differs from FIG. 1 exclusively in that the working pump 28 and the feed and lubrication pressure pump 29 are in drive connection with the spur gear 4, whereby the working pump 28 and the feed and lubrication pressure pump 29 can be configured with a smaller displacement, since the rotational speed of the spur gear 4 is greater than the rotational speed of the spur gear 3. It is also possible to only connect the working pump 28 to the spur gear 4 and the feed pump 29 to the input shaft 2, or the working pump 28 to the input shaft 2 and the feed pump 29 to the spur gear 4.

LIST OF REFERENCE NUMERALS

1 Engine
2 Input shaft
3 Spur gear
4 Spur gear
5 Clutch for forward travel
6 Clutch for reverse travel
7 Reversing unit
8 Spur gear
9 Spur gear
10 Spur gear
11 Outer central gear
12 Planetary gear set
13 Inner central gear
14 First hydrostatic unit
15 Planetary gear carrier
16 Spur gear
17 Spur gear
18 Second hydrostatic unit
19 Gear clutch
20 Reduction gear
21 Spur gear
22 Gear clutch
23 Spur gear
24 Spur gear
25 Spur gear
26 Output drive
27 Common component
28 Working pump
29 Feed pump

The invention claimed is:

1. A power split transmission comprising a hydrostatic branch and a mechanical branch which are summed via a summation gear (12),
at least two operating ranges in one forward travel direction and at least two operating ranges in one reverse travel direction,
the hydrostatic branch having a first hydrostatic unit (14) and a second hydrostatic unit (18),
displacement of the first and the second hydrostatic units (14, 18) being adjustable via a common component (27) which is connected to the first and the second hydrostatic units (14, 19), and
a travel direction clutch for forward travel (5) is concentric with respect to an input shaft (2) of the power split transmission.

2. The power split transmission of claim 1, wherein a gear shifting mechanism (20) is arranged between the summation gear (12) and an output drive (26).

3. The power split transmission of claim 2, wherein, in a first gear, a planetary gear carrier (15) of the summation gear (12) is connectable to the output drive (26) via a first reduction stage of the gear shifting mechanism (20), and, in a second gear, the planetary gear carrier (15) of the summation gear (12) is connectable to the output drive (26) via a second reduction stage of the gear shifting mechanism (20).

4. The power split transmission of claim 1, wherein, when an input shaft (2) rotates and an output drive (26) is at a standstill, the first hydrostatic unit (14) is adjusted to a zero displacement and the second hydrostatic unit (18) is adjusted to a maximum displacement.

5. The power split transmission of claim 1, wherein, when an input shaft (2) rotates and the output drive (26) rotates at a maximum possible speed, the first hydrostatic unit (14) is adjusted to a maximum displacement and the second hydrostatic unit (18) is adjusted to a zero displacement.

6. A power split transmission comprising a hydrostatic branch and a mechanical branch which are summed via a summation gear (12),
at least two operating ranges in one forward travel direction and at least two operating ranges in one reverse travel direction,
the hydrostatic branch having a first hydrostatic unit (14) and a second hydrostatic unit (18), and
displacement of the first and the second hydrostatic units (14, 18) being adjustable via a common component (27) which is connected to the first and the second hydrostatic units (14, 19),
wherein the summation gear (12) comprises of a planetary gear set, an inner central sun gear (13) of the planetary gear set is connected to the first hydrostatic unit (14) and an outer central annular gear (11) of the planetary gear set is driven by an engine (1), and the second hydrostatic unit (18) is operatively connected to a planetary gear carrier (15) of the planetary gear set.

7. A power split transmission comprising a hydrostatic branch and a mechanical branch which are summed via a summation gear (12), at least two operating ranges in one forward travel direction and at least two operating ranges in one reverse travel direction, the hydrostatic branch having a first hydrostatic unit (14) and a second hydrostatic unit (18), and displacement of the first and the second hydrostatic units (14, 18) being adjustable via a common component (27) which is connected to the first and the second hydrostatic units (14, 19), wherein a reversing gear (7) is arranged, in a power flow, between an engine (1) and the summation gear (12).

8. A power split transmission comprising a hydrostatic branch and a mechanical branch which are summed via a summation gear (12), at least two operating ranges in one forward travel direction and at least two operating ranges in one reverse travel direction, the hydrostatic branch having a first hydrostatic unit (14) and a second hydrostatic unit (18), and displacement of the first and the second hydrostatic units (14, 18) being adjustable via a common component (27) which is connected to the first and the second hydrostatic units (14, 19), wherein a hydraulic working pump (28) is operatively connected to the input shaft (2) and is concentric with an input shaft (2) of the power split transmission.

9. A power split transmission comprising a hydrostatic branch and a mechanical branch which are summed via a summation gear (12), at least two operating ranges in one forward travel direction and at least two operating ranges in one reverse travel direction, the hydrostatic branch having a first hydrostatic unit (14) and a second hydrostatic unit (18), and displacement of the first and the second hydrostatic units (14, 18) being adjustable via a common component (27) which is connected to the first and the second hydrostatic units (14, 19), wherein a hydraulic working pump (28) is operatively connected to an output drive (4) of a travel direction clutch for reverse travel (6) and is concentric with the travel direction clutch (6) for reverse travel of the power split transmission.

* * * * *